US012605684B2

(12) United States Patent
Haag

(10) Patent No.: US 12,605,684 B2
(45) Date of Patent: Apr. 21, 2026

(54) METERING SYSTEM

(71) Applicant: RAMPF Production Systems GmbH & Co. KG, Zimmern ob Rottweil (DE)

(72) Inventor: Gerd Haag, Dunningen (DE)

(73) Assignee: RAMPF Production Systems GmbH & Co. KG, Zimmem ob Rottwell (DE)

( * ) Notice: Subject to any disclaimer, the term of this patent is extended or adjusted under 35 U.S.C. 154(b) by 845 days.

(21) Appl. No.: 17/636,761

(22) PCT Filed: Aug. 10, 2020

(86) PCT No.: PCT/EP2020/072394
§ 371 (c)(1),
(2) Date: Feb. 18, 2022

(87) PCT Pub. No.: WO2021/032521
PCT Pub. Date: Feb. 25, 2021

(65) Prior Publication Data

US 2022/0288548 A1 Sep. 15, 2022

(30) Foreign Application Priority Data

Aug. 19, 2019 (DE) ..................... 10 2019 212 373.2

(51) Int. Cl.
*B01F 35/71* (2022.01)
*B01F 27/09* (2022.01)
(Continued)

(52) U.S. Cl.
CPC ........ *B01F 35/7176* (2022.01); *B01F 27/092* (2022.01); *B01F 27/1171* (2022.01);
(Continued)

(58) Field of Classification Search
CPC ............. B01F 2101/36; B01F 35/7176; B05C 11/1015
See application file for complete search history.

(56) References Cited

U.S. PATENT DOCUMENTS 4,938,381 A * 7/1990 Mandeville ........... B29B 7/7461 222/146.2
5,065,695 A * 11/1991 Baron .................... G05B 19/42 118/704
(Continued)

FOREIGN PATENT DOCUMENTS

CA 3024743 A1 5/2019
CN 105555418 A 5/2016
(Continued)

OTHER PUBLICATIONS

Chinese Application No. 202080058284.3, Office Action mailed Oct. 11, 2023, 12 pages.
(Continued)

*Primary Examiner* — Claire X Wang
*Assistant Examiner* — Patrick M McCarty
(74) *Attorney, Agent, or Firm* — Kilpatrick Townsend & Stockton LLP

(57) ABSTRACT

A metering system for applying a bead of a multi-component composite material to a component. The metering system comprises a mixing head including a mixing chamber. The metering system includes one supply line for each component of a multi-component composite material, leading from a source of each component to the mixing chamber. The mixing chamber is configured to mix the components of the multi-component composite material in the mixing chamber and has an outlet opening through which the mixed multi-component composite material exits the mixing head. The metering system includes a metering pump to convey a discharge of the multi-component composite material through the outlet opening. The metering system includes a control unit to output, to the metering pump, a control signal comprising control information and adjust a metering output of the multi-component composite material through the
(Continued)

outlet opening of the mixing head based on the control signal.

17 Claims, 6 Drawing Sheets

(51) Int. Cl.

| | |
|---|---|
| ***B01F 27/117*** | (2022.01) |
| ***B01F 35/221*** | (2022.01) |
| ***B05C 5/02*** | (2006.01) |
| ***B05C 11/10*** | (2006.01) |
| ***B05D 1/26*** | (2006.01) |
| *B01F 101/36* | (2022.01) |

(52) U.S. Cl.

CPC ...... *B01F 35/22141* (2022.01); *B05C 5/0216* (2013.01); *B05C 11/1005* (2013.01); *B05C 11/1015* (2013.01); *B05D 1/26* (2013.01); *B01F 2101/36* (2022.01); *B01F 2215/0481* (2013.01)

(56) References Cited

U.S. PATENT DOCUMENTS

| | | | | | |
|---|---|---|---|---|---|
| 5,082,142 | A * | 1/1992 | Saidman | B29B 7/7621 222/1 |
| 5,292,066 | A * | 3/1994 | Torii | B05C 11/1023 239/69 |
| 5,470,416 | A | 11/1995 | Herring et al. | |
| 5,666,325 | A * | 9/1997 | Belser | G01B 17/00 73/598 |
| 5,979,794 | A | 11/1999 | DeFillipi et al. | |
| 7,211,162 | B2 * | 5/2007 | Okuda | B29C 48/32 264/45.9 |
| 2004/0253365 | A1 | 12/2004 | Warren et al. | |
| 2013/0249144 | A1 * | 9/2013 | Carlson | B29C 45/045 264/328.8 |
| 2014/0209630 | A1 * | 7/2014 | O'Leary | B29B 7/72 222/145.2 |
| 2015/0331322 | A1 * | 11/2015 | Carcasi | G03F 7/162 222/1 |
| 2016/0193621 | A1 | 7/2016 | Mori et al. | |
| 2019/0060925 | A1 * | 2/2019 | Gerke | B29C 44/3446 |
| 2020/0179972 | A1 * | 6/2020 | Mine | B25J 9/04 |
| 2021/0040258 | A1 * | 2/2021 | Carroll | C08G 18/4833 |

FOREIGN PATENT DOCUMENTS

| | | | | |
|---|---|---|---|---|
| DE | 69021136 | T2 | 12/1995 | |
| DE | 102005026050 | A1 | 12/2006 | |
| EP | 3656477 | A1 | 5/2020 | |
| JP | 2005246270 | A | 9/2005 | |
| JP | 2007326002 | A | 12/2007 | |
| JP | 5154879 | B2 * | 2/2013 | B05C 11/1021 |
| KR | 20160054540 | A | 5/2016 | |
| WO | 9215401 | A1 | 9/1992 | |
| WO | 2006118088 | A1 | 11/2006 | |
| WO | WO-2006128560 | A1 * | 12/2006 | B01F 13/1055 |
| WO | 2019142557 | A1 | 7/2019 | |

OTHER PUBLICATIONS

"2K-Verklebung", Retrieved from http://www.plastverarbeiter.de/26992/2k-verklebung/, Jul. 28, 2014, 1 page.

"Roboter Sorgen Fur Perfekte Klebung", Retrieved from https://mav.industrie.de/allgemein/roboter-sorgen-fuerperfekte-klebung/, Apr. 1, 2000, 3 pages.

German Application No. 10 2019 212 373.2, "Search Report", Apr. 21, 2020, 9 pages.

International Application No. PCT/EP2020/072394, "International Search Report and Written Opinion", Nov. 10, 2020, 18 pages.

Indian Application No. 202117053912, First Examination Report mailed Feb. 24, 2025, 7 pages.

Korean Patent Application No. 10-2022-7004531, Office Action, Dec. 3, 2024, 10 pages.

* cited by examiner

METERING SYSTEM

CROSS REFERENCE TO RELATED APPLICATION

This application is a U.S. national phase of International Patent Application No. PCT/EP2020/072394 filed on Aug. 10, 2020, which claims priority to German Patent Application No. 10 2019 212 373.2, filed in Germany on Aug. 19, 2019. The entire contents of both applications are hereby incorporated herein by this reference.

The invention relates to a metering system for applying a bead of a multi-component composite material to a component.

When applying a bead of a multi-component composite material to a component, for example to glue two components together, the bead of multi-component composite material runs along a trajectory that typically has portions having different curvatures. If, for example, the bead is applied in a substantially rectangular trajectory, the trajectory has four straight portions, i.e. four portions having a curvature of zero, and four sharply curved portions, for example in the form of an arc. The components of the multi-component composite material are mixed in a mixing chamber of a mixing head and applied to the component through an outlet opening.

Metering systems known from the prior art are designed to have a uniform metering output when applying a bead of multi-component composite material to a component. If, at any point on the trajectory, a predetermined thickness of the bead of multi-component composite material is desired, i.e. a uniform cross-sectional area of the bead of multi-component composite material, the metering output of the metering system has to be adjusted such that the predetermined thickness of the bead is guaranteed at those points at which the outlet opening traverses a portion of the trajectory at low speed for system-related reasons. This is usually the case in portions having sharp curvatures, i.e. small radii of curvature, since here a corresponding drive cannot greatly accelerate the outlet opening. In turn, however, due to the uniform metering output and the required bead thickness in the straight portions of the trajectory, there are limits in terms of the movement speed of the outlet opening, and so the outlet opening has to be moved along the trajectory at a substantially uniform speed.

It is thus clear that in the known metering systems a need for rapid application of multi-component composite material along the predetermined trajectory and a need for a uniform cross section of the bead of multi-component composite material along the trajectory are completely incompatible with one another.

In view of these drawbacks, the object of the present invention is to provide a metering system that reduces the amount of time required to apply a bead of multi-component composite material to a component.

According to a first aspect of the present invention, this object is achieved by a metering system for applying a bead of a multi-component composite material to a component, the metering system comprising a mixing head, which has one supply line for each component of the multi-component composite material, leading from a source of each component to a mixing chamber of the mixing head, which is configured to mix the individual components of the multi-component composite material in the mixing chamber, and which has an outlet opening through which the mixed multi-component composite material exits the mixing head, and comprising a metering pump, which is configured to convey a discharge of the multi-component composite material through the outlet opening of the mixing head, and comprising a control unit, which is configured to output, to the metering pump, a control signal comprising control information, in such a way that a metering output of the multi-component composite material through the outlet opening of the mixing head is adjusted on the basis of the control signal, the control unit being configured to contain and/or receive information related to a trajectory, and/or to a path velocity based on the trajectory, along/by which the outlet opening will be moved in order to apply the multi-component composite material, and, for each portion of the trajectory to which a different path velocity is allocated compared with at least one directly adjacent portion of the trajectory, the control unit furthermore being configured to output separate control information to the metering pump, in such a way that a cross-sectional area of the bead of multi-component composite material remains substantially constant over the entire trajectory, which comprises different path velocities, the metering system in each case comprising one pump set per component of the multi-component composite material, the pump set comprising the metering pump and a supply pump, the metering pump being arranged adjacently to the outlet opening of the mixing head, in particular at a maximum distance therefrom of 2 m, measured along a fluid path from the metering pump towards the outlet opening, and the supply pump being arranged adjacently to a respective component container that contains a particular component of the multi-component composite material.

In this case, the components can be mixed “dynamically”, i.e. using an active stirring element, “statically”, i.e. by bringing the components together without using an active stirring element, or “static-dynamically”, i.e. by rotating an additional mixing filament through which at least one of the components enters the mixing chamber. In many applications, a dynamic mixing head may be preferred since this makes it possible to achieve reproducibly uniform intermixing of the components with a minimal mixing volume.

“Metering output” should in particular be understood as a ratio of the volume of multi-component composite material discharged to the rate at which the multi-component composite material is discharged from the outlet opening, or, in other words, volume discharged (e.g. in terms of volume and/or weight) per unit of time (e.g. per second). For instance, if the volume discharged is low and the discharge rate is high, the same metering output can be achieved as if the volume discharged were high and the discharge rate low. However, metering output can be increased if at least one out of the volume discharged and the discharge rate is kept constant while the other is increased (or both are increased).

In addition, it is pointed out at this juncture that the “cross-sectional area” of the bead of multi-component composite material is viewed in particular in a direction that is at a right angle to the direction in which the bead of multi-component composite material is applied to a component. In this context, a uniform cross-sectional area need not necessarily require a uniform cross-sectional shape, but this may be advantageous. Advantageously, the control unit can receive the information related to a trajectory and/or to a path velocity based on the trajectory from a CNC controller that is configured to control a drive, which is configured to move the outlet opening along the trajectory.

When using two-component foams, it may be advantageous to actuate, i.e. operate, the metering pump assigned to the base component for a predetermined amount of time, e.g. 5 ms, before the metering pump assigned to the curing agent.

In this way, if the base component contains gas, a delivery rate can be adjusted and adapted accordingly on the basis of this compressibility of the base component.

The metering system according to the invention makes it possible to adapt the metering in a highly dynamic manner depending on the trajectory. For instance, the outlet opening can be moved continually at the maximum speed for a particular portion of the trajectory or a particular curvature of the trajectory. In the process, the metering system according to the invention allows the metering output to be increased proportionally in portions where the outlet opening has a higher speed, and to be reduced proportionally in portions where the outlet opening has a lower speed, such that the cross-sectional area of the bead of multi-component composite material remains substantially constant along the entire trajectory on which the multi-component composite material is applied.

By arranging the metering pump closely relative to the outlet opening of the mixing head, it is possible to adapt the metering output in a significantly more dynamic way, and thus more quickly. For example, dynamic losses due to resilience of line walls or compressibility of the multi-component composite material or the components thereof can be reduced or even prevented as a result. In particular, this dynamic adaptation of the metering output can be achieved in conjunction with highly dynamic control technology that is configured to carry out an advance calculation of a path velocity, a volume discharged and/or a discharge rate in the range of 1-128 ms and to output corresponding control information to the metering pump.

The supply pump of each component can be operated continuously, at least during application of the multi-component composite material, or it can merely be switchable between an ON state, having a predetermined delivery rate, and an OFF state. Alternatively or additionally, the supply pumps can also be operated in a speed-controlled manner, such that it can be ensured that a pump inlet pressure at the metering pumps is constant regardless of the consumption. Therefore, in the description below, reference is essentially made to control of the metering pump, but it goes without saying that the description can also be applicable to actuation of the supply pump.

In particular, the outlet opening of the mixing head can be formed as a portion of the mixing chamber, or can be connected to the mixing chamber by means of a line. The mixing head can thus have an opening through which the multi-component composite material can be applied directly to the component. If, however, it is desirable for the mixing head to be arranged further away from the component, for example due to reduced accessibility to the component, the outlet opening can be connected by means of the line to an opening of the mixing head through which the multi-component composite material exits the mixing chamber.

The line can be formed between the outlet opening and the mixing chamber of the mixing head as a tube or a hose line. In particular in the case where the line is formed as a hose line, it may be possible to move just the outlet opening of the hose line along the trajectory and to not move the mixing head relative to the component, or to move it in particular along a simplified, for example circular or rectangular, trajectory.

In addition, the metering system can be configured to move the outlet opening for applying the multi-component composite material at a speed of from 1 m/min to 100 m/min, in particular from 3 m/min to 60 m/min. In this way, portions having narrow radii of curvature and portions having a straight trajectory course can both be traversed at the respective maximum speeds.

For each trajectory portion having a uniform path velocity, the control unit can be configured to output separate control information to the metering pump in separate control signals and/or said control unit can be configured to output, to the metering pump, a plurality of pieces of control information, separated for each trajectory portion having a uniform path velocity, together in at least one control signal. In other words, relevant control information comprising, for example, instructions to the metering pump about the output at which the metering pump should operate can be output each time in a separate control signal when the content of the control information, i.e. the instructions to the metering pump, changes, or a single control signal can comprise a plurality of pieces of control information. In the process, it may be advantageous for the control information to additionally comprise a time period over which the metering pump should be operated at a predetermined output.

In particular, the trajectory, which comprises different path velocities, can be formed as a closed ring. For example, the bead of multi-component composite material can be applied along an edge of a component, such as a windscreen, in order to glue it to a frame. Since the trajectory, i.e. the bead of multi-component composite material, is formed as a closed ring, the entry of liquid or foreign matter from outside the closed ring can be prevented. It goes without saying that a ring of this kind need not be circular, but rather can be formed, for example, approximately rectangularly as a sequence of straight portions and arc portions.

Within the context of the present invention, the multi-component composite material can be an adhesive or sealant comprising two or more components, in particular an adhesive foam or sealing foam, which preferably comprises polyurethane or silicone. A typical example of this may be an FIPFG seal. In the example of a two-component substance, two pump sets can be arranged accordingly. Therefore, since the supply pumps implement a "base supply" of components to the mixing head, and the metering pumps allow components to be introduced into the mixing head highly accurately and quickly, the present invention, unlike the prior art, makes it possible to also apply foams using trajectory-independent control, for example based on a CNC controller, and which have a consistent cross section.

In addition, the metering system, in particular the metering pump, can be configured to discharge the multi-component composite material in an output range of from 0.1 $cm^3$/s to 20 $cm^3$/s. As a result, it is possible, even in portions of the trajectory in which the outlet opening is moved along the component at high speed, to be able to apply enough multi-component composite material to the component to guarantee the uniform bead thickness of the multi-component composite material.

In a development of the present invention, the control unit can furthermore be configured to assign, to related portions of the trajectory that have a consistent curvature, a uniform path velocity and/or uniform control information for the metering pump, in order to adjust the discharge of the multi-component composite material. As a result, processing work by the control unit can be reduced. For instance, a portion formed as an arc and therefore having a consistent radius of curvature can be assigned a uniform path velocity for moving the outlet opening and thus a uniform metering output of the metering pump, and these can be output to the metering pump as a control signal comprising control information. It goes without saying that, in any such related portions of the trajectory, an acceleration or deceleration of the outlet opening at the beginning or end of each related portion can be taken into account. For this purpose, it may be conceivable either to consider the distance of the acceleration or deceleration of the outlet opening as not being associated with the related portion, or to map corresponding accelerations and decelerations of the outlet opening analogously in the control information or instructions for the metering pump.

In a second aspect of the present invention, the present object is achieved by a method for uniformly applying a bead of a multi-component composite material to a component, the method comprising providing a mixing head, which has one supply line for each component of the multi-component composite material, leading from a source of each component to a mixing chamber of the mixing head, which is configured to mix the individual components of the multi-component composite material in the mixing chamber, and which has an outlet opening through which the mixed multi-component composite material exits the mixing head, providing a metering pump, which is configured to convey a discharge of the multi-component composite material through the outlet opening of the mixing head, and providing a control unit, which outputs, to the metering pump, a control signal comprising control information, in such a way that a metering output of the multi-component composite material through the outlet opening of the mixing head is adjusted on the basis of the control signal, the control unit containing and/or receiving information related to a trajectory, and/or to a path velocity based on the trajectory, along/by which the outlet opening will be moved in order to apply the multi-component composite material, and, for each portion of the trajectory to which a different path velocity is allocated compared with at least one directly adjacent portion, the control unit furthermore outputting separate control information to the metering pump, in such a way that a cross-sectional area of the bead of multi-component composite material remains substantially constant over the entire trajectory, which comprises different path velocities, the metering system in each case comprising one pump set per component of the multi-component composite material, the pump set comprising the metering pump and a supply pump, the metering pump being arranged adjacently to the outlet opening of the mixing head, in particular at a maximum distance therefrom of 2 m, measured along a fluid path from the metering pump towards the outlet opening, and the supply pump being arranged adjacently to a respective component container that contains a particular component of the multi-component composite material.

It is pointed out at this juncture that all the features, effects and advantages described in relation to the device according to the invention are also applicable to the method according to the invention, and vice versa.

In a development, the method according to the invention can comprise the fact that the metering system can move the outlet opening for applying the multi-component composite material at a speed of from 1 m/min to 100 m/min, in particular from 3 m/min to 60 m/min. This can allow the outlet opening to traverse portions having a low curvature rapidly and to traverse portions having a sharp curvature in an adapted manner.

Furthermore, for each trajectory portion having a uniform path velocity, the control unit can output separate control information to the metering pump in separate control signals and/or said control unit can output, to the metering pump, a plurality of pieces of control information, separated for each trajectory portion having a uniform path velocity, together in at least one control signal. To reduce the processing work by the metering system or control unit, control information can be output only when an output of the metering pump is to be changed. In addition, control information in relation to different metering outputs along individual portions can be combined in control signals.

The metering system, in particular the metering pump, can discharge the multi-component composite material in an output range of from 0.1 $cm^3/s$ to 20 $cm^3/s$. In this way, the metering output of the metering pump can be adapted to the movement speed of the outlet opening along the trajectory.

Advantageously, the control unit can assign, to related portions of the trajectory that have a consistent curvature, a uniform path velocity and/or uniform control information, such that the metering pump leaves the discharge of the multi-component composite material over each related portion unchanged. This can also contribute to a reduction in the processing work required for controlling the metering system. In particular, the control unit can output no control information to the metering pump for as long as the outlet opening is being moved through a trajectory portion having a consistent curvature.

The metering system can further comprise an air-conditioning apparatus, which is configured to control the temperature of, i.e. to cool or heat, at least one of the components of the multi-component composite material.

The present invention will be described in greater detail below on the basis of an example embodiment. In the drawings.

FIGS. 3*a* to 3*d* are longitudinal sections through beads of a multi-component composite material.

Figure 4:
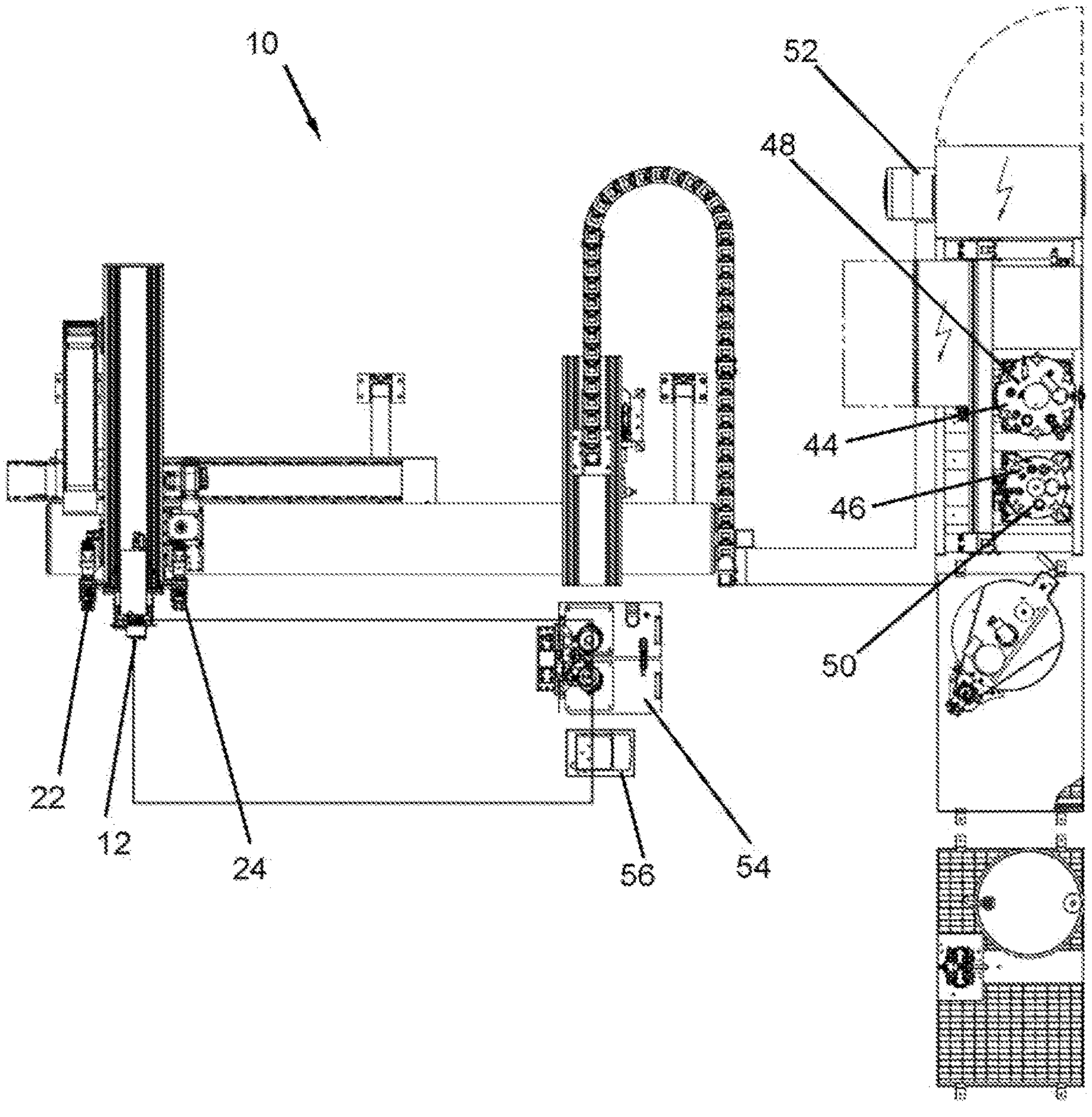
Figure 5:
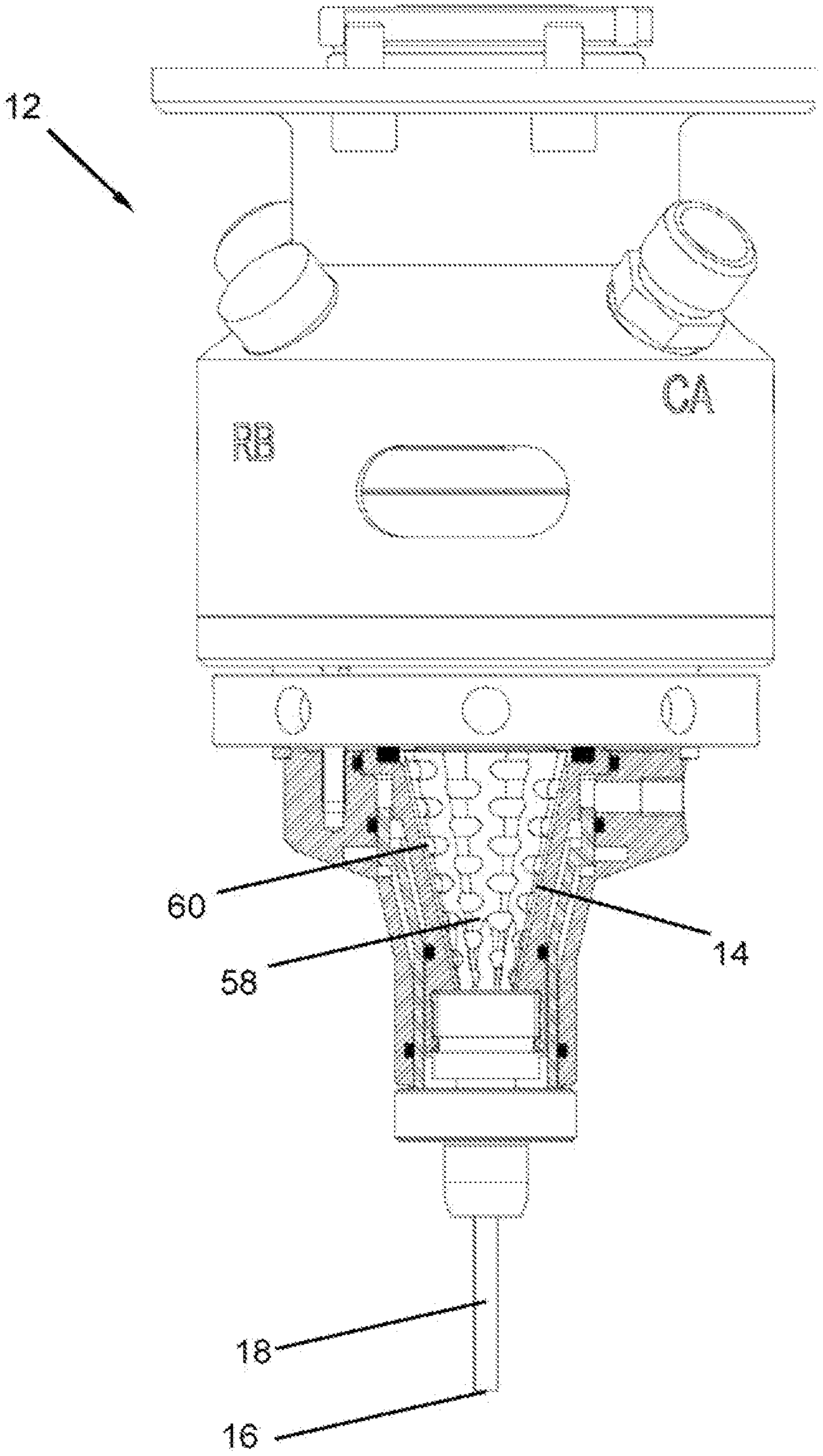
Figure 6:
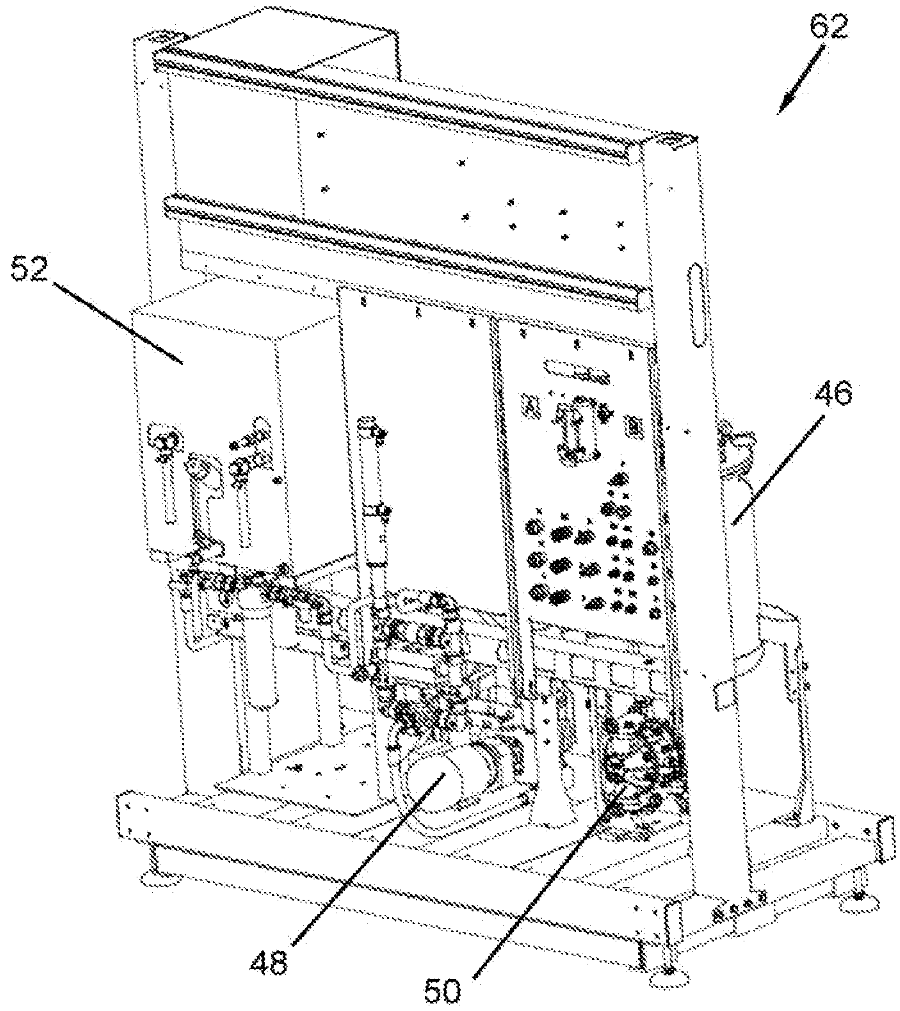

FIG. 4 is a plan view of the metering system according to the invention;

FIG. 5 is a sectional side view of a dynamic mixing head of the metering system according to the invention; and FIG. 6 is a perspective view of a container frame of the device according to the invention.

Figure 1:
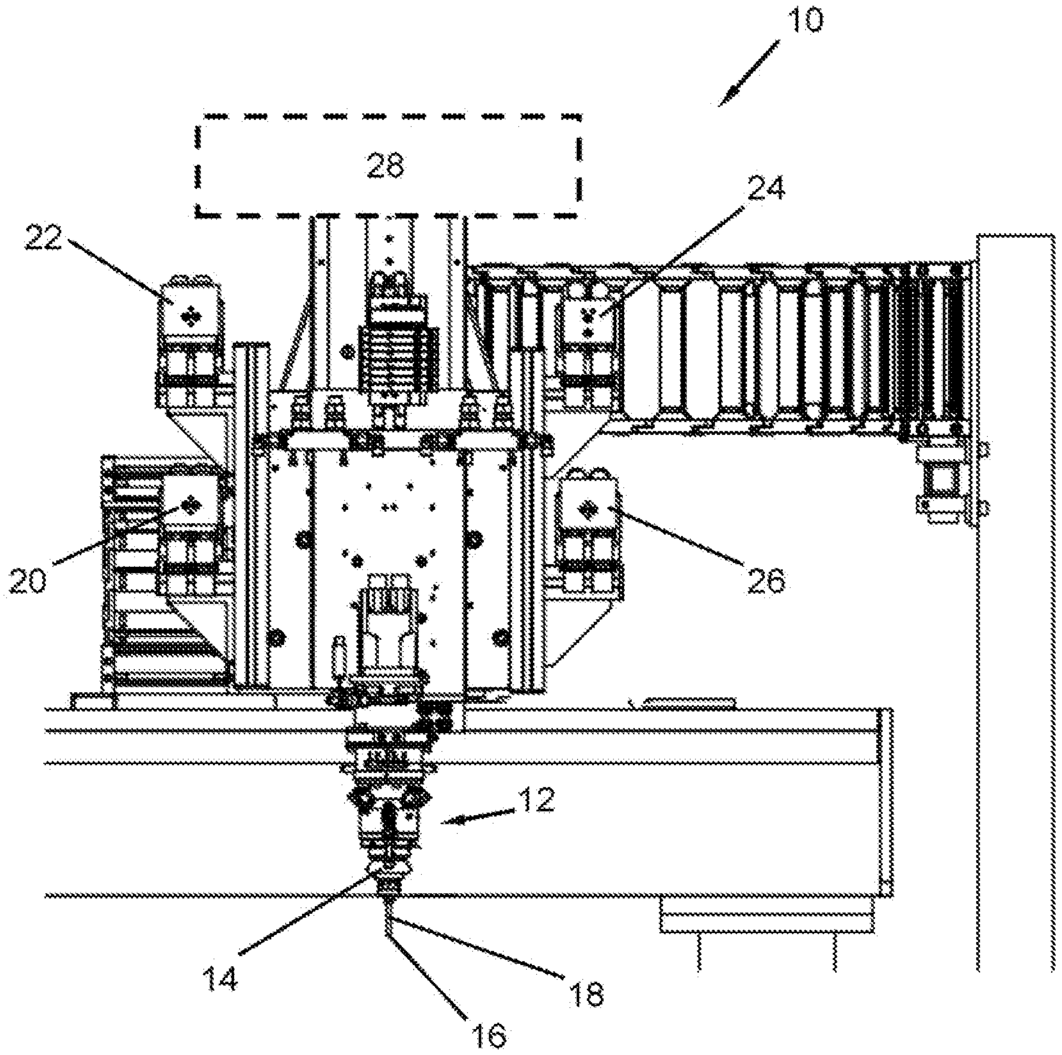
FIG. 1 is a side view of an embodiment of the device according to the invention.

FIG. 1 denotes a metering system according to the invention in general terms by reference numeral 10. The metering system 10 comprises a mixing head 12, in which components of a multi-component composite material are mixed together in a mixing chamber 14. The multi-component composite material is applied to a component from the mixing head 12 through an outlet opening 16. In the example embodiment shown in FIG. 1, the outlet opening 16 is connected to the mixing chamber 14 by means of a tubular outflow nozzle 18.

In the embodiment shown here, the components of the multi-component composite material are conveyed by means of four metering pumps 20, 22, 24, 26 from component sources (not shown) to the mixing chamber, and from there to the outlet opening 16. As described at the outset, however, it may also be conceivable to form a metering system 10 according to the invention having two or three metering pumps.

A control unit 28 in data-communication with the metering pumps 20, 22, 24, 26 delivers control information to the metering pumps 20, 22, 24, 26, the respective metering outputs of the metering pumps 20, 22, 24, 26 being adjusted on the basis of said control information. In this case, the metering output can in particular be deemed to be the volume and/or mass conveyed per second by each metering pump 20, 22, 24, 26.

Figure 2:
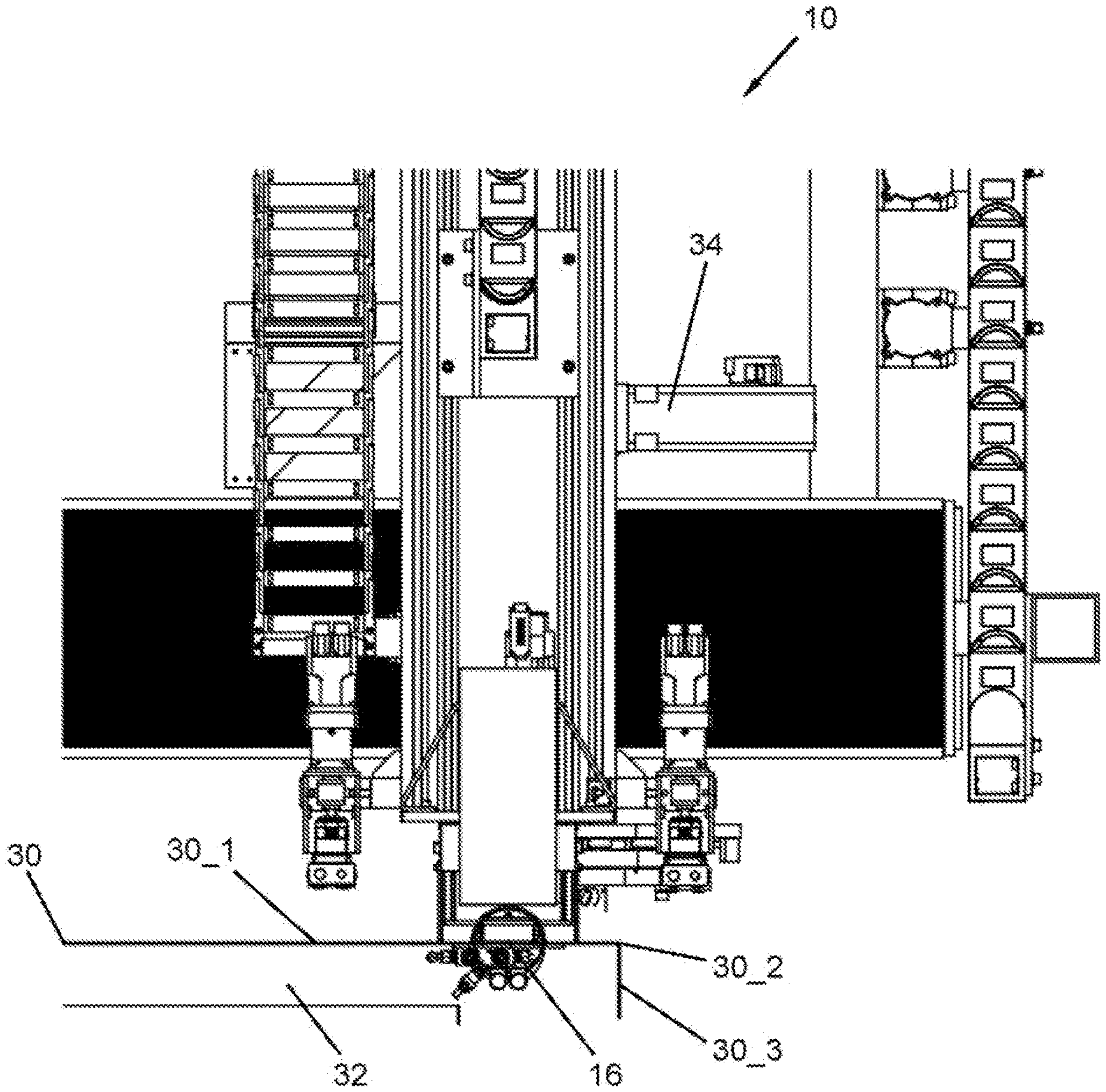
FIG. 2 is a plan view of the device from FIG. 1.

In FIG. 2, the metering system 10 is viewed vertically from above and it can be seen that the outlet opening 16 (in FIG. 2 concealed by components above it) is moved along a trajectory 30, on which the multi-component composite material is to be applied to a component 32.

In the process, the trajectory 30 comprises a first portion 30_1, which extends substantially in a straight line, a second portion 30_2, which has a 90° curvature, and a third portion 30_3, which again extends substantially in a straight line.

A drive 34 is configured to move the outlet opening 16 along the trajectory 30. Since, like all drives, the drive 34 requires a certain amount of time or a certain distance in order to accelerate the outlet opening 16, it is obvious that higher movement speeds of the outlet opening 16 can be achieved in the first portion 30_1 and the third portion 30_3 of the trajectory 30 than in the second portion 30_2, in which the outlet opening 16 has to traverse the 90° curvature.

Since the control unit 28 receives information, for example from a CNC control unit (not shown), related to the trajectory 30 and the path velocities of the outlet opening 16 that can be achieved therein by the drive 34, the control unit 28 can output, to the metering pumps 20, 22, 24, 26, control information related to a corresponding portion of the trajectory 30 in such a way that, despite varying path velocities of the outlet opening 16, the same amount of multi-component composite material is continually applied per unit of distance (for example when considered in each case over a path portion having a length of 5 cm).

FIGS. 3*a* to 3*d* show longitudinal sections through beads 36, 38, 40, 42 of a multi-component composite material, the longitudinal sections having been taken, by way of example, along a plane that is substantially parallel to a page plane in FIG. 2. The arrows in FIGS. 3*a* to 3*d* indicate the direction in which the respective beads 36, 38, 40, 42 of multi-component composite material have been applied.

Figure 3A:
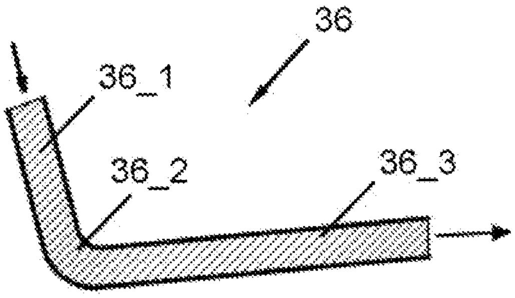
FIG. 3a (Prior Art)

In this context, FIG. 3*a* shows a bead 36 which has been produced using a conventional prior-art metering system. In other words, the bead 36 has been applied with a constant movement speed of an outlet opening and a constant metering output of a metering pump. The portions 36_1, 36_2 and 36_3 have a substantially uniform bead thickness.

Figure 3B:
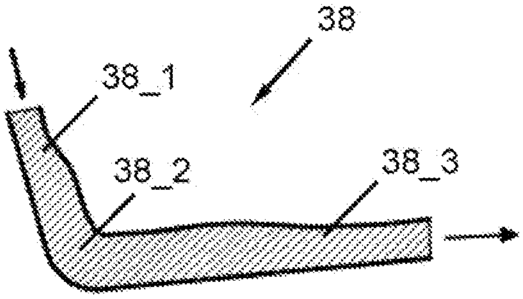

FIG. 3*b* comprehensibly illustrates the problem that occurs when a known metering system is modified merely to the extent that the outlet opening 16 is moved at a higher speed in straight portions of the trajectory 30 than in curved portions of the trajectory 30. The metering output of the metering system remains constant in the process. It can be seen in FIG. 3*b* that the thickness of the bead 38 initially increases in a region 38_1, in which the outlet opening 16 is decelerated in order to subsequently traverse the curved region 38_2, and then reaches the thickness that corresponds to the speed of the outlet opening 16 at which the portion 38_2 is traversed. In a portion 38_3, downstream of the curved portion 38_2, the outlet opening 16 is accelerated again such that the thickness of the bead 38 accordingly decreases again.

Figure 3C:
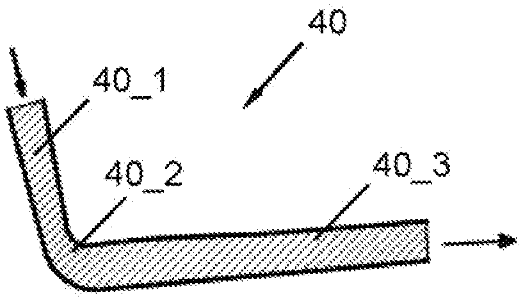

FIG. 3*c* now shows another undesirable result of an application of a bead 40 of multi-component composite material to a component. During application of the bead 40, the speed at which the outlet opening 16 is moved is adapted on the basis of the curvatures of the portions 40_1, 40_2 and 40_3, but the metering output of a metering pump or of metering pumps 20, 22, 24, 26 is not controlled in proportion to the speed of the movement of the outlet opening 16. As a consequence, the metering pump either decelerates or accelerates too sharply, and so a thickness of the bead 40 decreases in the portion 40_1 towards the portion 40_2, increases again in the portion 40_2 towards the start of the portion 40_3, and then decreases again over the portion 40_3.

Figure 3D:
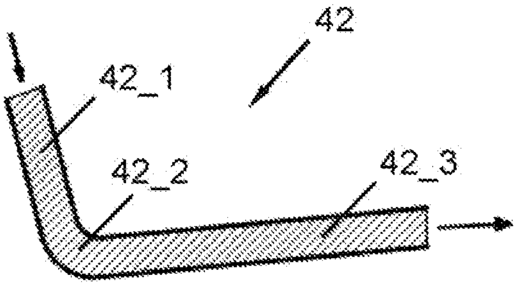

FIG. 3*d* now shows the result of applying a bead 42 of a multi-component composite material on the basis of the present invention. When the bead 42 is applied, both a movement speed of the outlet opening 16 is varied, and a metering output of the metering pumps 20, 22, 24, 26 is controlled in proportion to the movement speed of the outlet opening 16. As a result, it is possible to generate a bead 42 that has a consistent thickness over the portions 42_1, 42_2 and 42_3, i.e. a cross-sectional area that is consistent in planes arranged at right angles to the page plane in FIG. 3*d* and at right angles to an application direction of the bead 42.

FIG. 4 is a plan view of the metering system 10. In this case, the mixing head 12 is viewed from above, similarly to FIG. 2. On both sides of the mixing head 12, first and second metering pumps 22, 24 are arranged; in this case, by way of example, the first metering pump 22 is to be assigned to the first component A and the second metering pump 24 is to be assigned to the second component B.

In the bottom right-hand region in FIG. 4, a first component container 44 of the first component A and a second component container 46 of the second component B can be seen; in this case these containers are in the form of drums and are interchangeably connected to the metering system 10. The component containers 44 and 46 are each fluidically coupled to a supply pump 48, 50; here, the supply pump 48 conveys the first component A from the first component container 44, and the supply pump 50 conveys the second component B from the second component container 46, to the mixing head 12 by means of lines (not shown). During an operating phase of the mixing head, the supply pumps 48, 50 are operated either continuously or in a speed-controlled manner, such that a supply of the components to the mixing head and maintenance of a predetermined overpressure in the supply lines remain guaranteed.

In this case, the metering system 10 further comprises an air-conditioning apparatus 52, which is configured to control the temperature of, i.e. cool or heat, at least one of the components A and B.

FIG. 4 also shows a flushing apparatus 54, for emptying and/or cleaning the mixing head 12, and scales 56.

FIG. 5 is a sectional side view, on an enlarged scale, of the mixing head 12. It can be seen that in this embodiment the mixing head 12 is in the form of a dynamic mixing head. In other words, in the mixing chamber 14 there is a stirring element 58 that turns within the mixing chamber 14 about the vertical axis (an axis from the top downwards in FIG. 5).

On its outer circumference, the stirring element 58 has recesses 60 for improving a stirring action of the stirring element 58. In this way, components introduced into the mixing chamber 14, for example components A and B, can be blended very homogeneously.

The mixed components exit the mixing chamber 14 through the tubular outflow nozzle 18 and are then applied to a workpiece through the outlet opening 16.

FIG. 6 shows a container frame 62, which is used, among other things, to receive the first component container (not shown) and second component container 46, the respective supply pumps 48, 50 and the air-conditioning apparatus 52. As can be seen, in this case the component containers are arranged above the supply pumps 48, 50, and so components A and B can be provided to the supply pumps 48, 50 in a gravity-assisted manner. In addition, the elevated arrangement of the component containers makes it simpler to swap them, for example by using a forklift truck.

The invention claimed is:

1. A metering system for applying a bead of a multi-component composite material to a component, comprising:

a mixing head, comprising:

a mixing chamber;

a first supply line for supplying a first component of the multi-component composite material from a source container of the first component to the mixing chamber;

a second supply line for supplying a second component of the multi-component composite material from a source container of the second component to the mixing chamber;

wherein the mixing chamber is configured to mix the first component and the second component of the multi-component composite material to form a mixed multi-component composite material comprising an adhesive foam or sealing foam in the mixing chamber; and an outlet opening through which the mixed multi-component composite material exits the mixing head;

a first metering pump connected to the first supply line and arranged at a maximum distance of 2 m from the outlet opening of the mixing head, wherein the first metering pump is configured to control the introduction of the first component of the multi-component composite material into the mixing chamber;

a second metering pump connected to the second supply line and arranged at a maximum distance of 2 m from the outlet opening of the mixing head, wherein the second metering pump is configured to control the introduction of the second component of the multi-component composite material into the mixing chamber, wherein the introduction of the first component and the second component into the mixing chamber causes a discharge of the mixed multi-component composite material through the outlet opening of the mixing head;

a drive configured to move the outlet opening along a trajectory based on trajectory information received from a drive controller, wherein the trajectory information relates to the trajectory and a path velocity based on the trajectory;

a control unit configured to output, to the first metering pump and the second metering pump, control signals comprising control information that causes first metering pump and the second metering pump to adjust metering outputs of the first component and the second component of the multi-component composite material, wherein the control unit is configured to receive, from the drive controller, the trajectory information, and to output, for each portion of the trajectory to which a different path velocity is allocated compared with at least one directly adjacent portion of the trajectory, first control information to the first metering pump a predetermined time period prior to outputting second control information to the second metering pump so that a cross-sectional area of the bead of the mixed multi-component composite material remains substantially constant over an entirety of the trajectory;

a first supply pump connected to the first supply line and arranged adjacently to the source container of the first component; and a second supply pump connected to the second supply line and arranged adjacently to the source container of the second component.

2. The metering system of claim 1, wherein the control unit is configured to output, for each trajectory portion having a uniform path velocity, separate control information to the first metering pump and the second metering pump in separate control signals.

3. The metering system of claim 1, wherein the trajectory, which comprises different path velocities, is formed as a closed ring.

4. The metering system of claim 1, wherein the metering system is configured to discharge the mixed multi-component composite material in an output range of from 0.1 $cm^3/s$ to 20 $cm^3/s$.

5. The metering system of claim 1, wherein the control unit is further configured to assign, to related portions of the trajectory that have a consistent curvature, one or more of a uniform path velocity or uniform control information for the first metering pump and the second metering pump to adjust the discharge of the mixed multi-component composite material.

6. The metering system of claim 1, wherein the control unit is configured to output to the first metering pump and the second metering pump a plurality of pieces of control information, separated for each trajectory portion having a uniform path velocity, together in at least one control signal.

7. The metering system of claim 1, wherein the outlet opening of the mixing head is formed as a portion of the mixing chamber or is connected to the mixing chamber by means of a line.

8. The metering system of claim 7, wherein the outlet opening of the mixing head is connected to the mixing chamber by means of the line, and wherein the line is formed between the outlet opening and the mixing chamber of the mixing head as a tubular outflow nozzle or a hose line.

9. The metering system of claim 1, wherein the metering system is configured to move the outlet opening for applying the mixed multi-component composite material at a speed of from 1 m/min to 100 m/min.

10. The metering system of claim 9, wherein the metering system is configured to move the outlet opening for applying the mixed multi-component composite material at a speed of from 3 m/min to 60 m/min.

11. A method for applying a bead of a multi-component composite material to a component, comprising:

providing a mixing chamber and a mixing head, the mixing head having a first supply line for supplying a first component of the multi-component composite material from a source container of the first component to the mixing chamber, and a second supply line for supplying a second component of the multi-component composite material from a source container of the second component to the mixing chamber, wherein the mixing head is configured to mix the first component and the second component of the multi-component composite material to form a mixed multi-component composite material comprising an adhesive foam or sealing foam in the mixing chamber, wherein the mixing head has an outlet opening through which the mixed multi-component composite material exits the mixing head;

providing a first metering pump connected to the first supply line and arranged at a maximum distance of 2 m from the outlet opening of the mixing head wherein the first metering pump is configured to control the introduction of the first component of the multi-component composite material into the mixing chamber;

providing a second metering pump connected to the second supply line and arranged at a maximum distance of 2 m from the outlet opening of the mixing head, wherein the second metering pump is configured to control the introduction of the second component of the multi-component composite material into the mixing chamber, wherein the introduction of the first component and the second component into the mixing chamber causes a discharge of the mixed multi-component composite material through the outlet opening of the mixing head;

operating the movement of the outlet opening along a trajectory based on trajectory information received from a drive controller, wherein the trajectory information relates to the trajectory and a path velocity based on the trajectory;

receiving at a control unit, the trajectory information;

operating the control unit to output first control information to the first metering pump a predetermined time period prior to outputting second control information to the second metering pump, wherein the first control information causes the first metering pump to adjust metering outputs of the first component and the second control information causes the second metering pump to output the second component of the multi-component composite material, and wherein the control unit outputs, for each portion of the trajectory to which a different path velocity is allocated compared with at least one directly adjacent portion of the trajectory, separate first control information to the first metering pump and second control information to the second metering pump so that a cross-sectional area of the bead of the mixed multi-component composite material remains substantially constant over the entire trajectory, providing a first supply pump connected to the first supply line and arranged adjacently to the source container of the first component; and providing a second supply pump connected to the second supply line and arranged adjacently to the source container of the second component.

12. The method of claim 11, wherein the control unit outputs, for each trajectory portion having a uniform path velocity, separate control information to the first metering pump and the second metering pump in separate control signals.

13. The method of claim 11, wherein the mixed multi-component composite material is discharged in an output speed ranging from 0.1 $cm^3/s$ to 20 $cm^3/s$.

14. The method of claim 11, wherein the control unit assigns, to related portions of the trajectory that have a consistent curvature, one or more of (a) a uniform path velocity or (b) uniform control information such that the first metering pump and the second metering pump operate to leave the discharge of the mixed multi-component composite material over each related portion unchanged.

15. The method of claim 11, wherein the control unit is configured to output to the first metering pump and the second metering pump a plurality of pieces of control information, separated for each trajectory portion having a uniform path velocity, together in at least one control signal.

16. The method of claim 11, wherein the outlet opening for applying the mixed multi-component composite material moves at a speed ranging from 1 m/min to 100 m/min.

17. The method of claim 16, wherein the outlet opening is configured to move at a speed ranging from 3 m/min to 60 m/min when applying the multi-component composite material.

* * * * *